(12) United States Patent
Mullen et al.

(10) Patent No.: US 10,033,707 B2
(45) Date of Patent: Jul. 24, 2018

(54) METHOD AND APPARATUS FOR EFFICIENT INTERRUPTIBLE TRANSFER OF PROTECTED MEDIA ASSETS

(71) Applicant: ARRIS Enterprises LLC, Suwanee, GA (US)

(72) Inventors: Brian D. Mullen, Duluth, GA (US); Geetha Mangalore, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 141 days.

(21) Appl. No.: 15/176,719

(22) Filed: Jun. 8, 2016

(65) Prior Publication Data

US 2016/0359817 A1  Dec. 8, 2016

Related U.S. Application Data

(60) Provisional application No. 62/172,797, filed on Jun. 8, 2015.

(51) Int. Cl.

| | | |
|---|---|---|
| *H04L 9/32* | (2006.01) | |
| *H04L 29/06* | (2006.01) | |
| *G06F 21/10* | (2013.01) | |
| *H04N 21/845* | (2011.01) | |
| *H04N 21/83* | (2011.01) | |
| *H04L 29/08* | (2006.01) | |

(52) U.S. Cl.
CPC .......... *H04L 63/0428* (2013.01); *G06F 21/10* (2013.01); *H04L 63/06* (2013.01); *H04N 21/8456* (2013.01); *H04L 67/06* (2013.01); *H04L 2463/101* (2013.01); *H04N 21/83* (2013.01)

(58) Field of Classification Search
CPC ..... H04L 63/0428; H04L 63/06; H04L 67/06; H04L 2463/101; H04N 21/8456; H04N 21/83; G06F 21/10
USPC ........................................................ 713/168
See application file for complete search history.

(56) References Cited

U.S. PATENT DOCUMENTS

| | | | |
|---|---|---|---|
| 6,920,436 B2 * | 7/2005 | Stefik ...................... | G06F 21/10 375/E7.009 |
| 8,527,424 B2 | 9/2013 | Yamashima et al. | |
| 9,294,529 B1 * | 3/2016 | Marwood ............ | H04N 21/254 |
| 9,785,756 B2 * | 10/2017 | Nakano ................... | G06F 21/10 |
| 2005/0209927 A1 | 9/2005 | Aaltonen et al. | |
| 2007/0162753 A1 * | 7/2007 | Nakano ................. | H04L 9/0844 713/171 |
| 2009/0328228 A1 * | 12/2009 | Schnell ................... | G06F 21/10 726/26 |
| 2016/0044004 A1 * | 2/2016 | Matsunaga ........... | H04L 63/061 713/168 |

OTHER PUBLICATIONS

PCT Search Report & Written Opinion, Re: Application No. PCT/US2016/036510, dated Aug. 30, 2016.

* cited by examiner

*Primary Examiner* — Mohammed Waliullah
(74) *Attorney, Agent, or Firm* — Thomas A. Ward

(57) ABSTRACT

A method and system is provided for efficient interruptible transfer of protected media assets. The method of asset transfer uses a segmented asset transfer paradigm which makes possible the implementation of such features as "watch as you transfer" and "offsetted resumption of interrupted transfers". Implementation strategies of these features with support for segmented and contiguous media assets are also disclosed.

18 Claims, 14 Drawing Sheets

METHOD AND APPARATUS FOR EFFICIENT INTERRUPTIBLE TRANSFER OF PROTECTED MEDIA ASSETS

CROSS-REFERENCE TO RELATED APPLICATIONS

This application claims benefit of U.S. Provisional Patent Application No. 62/172,797 entitled "EFFICIENT SOLUTION FOR INTERRUPTIBLE ASSET TRANSFERS," by Brian D. Mullen and Geetha Mangalore, filed Jun. 8, 2015, which application is hereby incorporated by reference herein.

BACKGROUND OF THE INVENTION

1. Field of the Invention

The present invention relates to systems and methods for the transfer of protected media assets, and in particular to a system and method for the interruptible transfer of protected media assets.

2. Description of the Related Art

It is often desirable for media content vendors to allow customers to play back copy-protected media assets on more than one device. For example, a consumer may have purchased a movie that is baselined for playback using a desktop computer or DVD player, but may later desire to play back the media content on another desktop computer, or a mobile device such as a laptop, tablet computer, or smartphone. FIG. 1 is a diagram depicting the transfer of a media asset from a source device 102 such as a DVD player or home computer to a sink device 104.

At the same time, the media content vendors typically desire to limit the number of usable (e.g. viewable) copies of the media asset at any given time. In other words, the goal is to transfer asset from a source to a sink without altering its status as copy protected. In this context, the term "copy protected" indicates that the asset is protected from being copied where "copied" means that two identical, usable assets are created from one usable asset. The modifier "usable" in the term "usable asset" indicates that the asset can be presented, played, decoded, streamed, transferred to another device, etc.

In order for a DRM to be able to provide dependable asset transfer (without the possibility for the creation of duplicate usable content) between two devices, a form of negotiation between the source device and the sink device after the content has been transferred is typically required. One such method for transferring one copy of a media content from a source device to a sink device is according to a basic protocol consisting of three phases: (1) authenticated key exchange (AKE), (2) transmit (T) and (3) commit (C). In this paradigm, the source and sink establish move key that is used to encrypt the media content before transmission, transmit the media content, and then commit the transfer. In the commit phase, the sink indicates to the source that it desires to mark its newly transferred content as "usable" so that it may be viewed on the sink device. The source device responds my marking it's version of the content as "unusable" and notifies the sink device that this has taken place. The sink device then alters the state of the newly transferred content to "usable" and notifies the source device. The source device acknowledges the sink device's indication that the content is usable on the sink device, and responds by marking its copy of the content as "unusable" or deletes it altogether. Using this paradigm, only one version of the content is usable at a time.

One example of this paradigm is the method of the Digital Transmission Content Protection-Internet Protocol (DTCP-IP) to transfer one copy of content from the source device to a sink device using a DTCP-IP "MOVE" instruction. A "MOVE" is the process by which a copy protected asset is transferred from a digital media source to a digital media sink device with DTCP-IP digital rights management (DRM). The MOVE protocol ensures that only one usable copy of a copy protected asset can be in existence at one time when in the act of sharing an asset between more than one device. DTCP-IP implements this negotiation as a "MOVE COMMITMENT".

While this type of coordination between the source and the sink device is necessary to determine which device retains the usable copy of the asset, it does not come without detracting from real-world user experiences of the solutions which may employ asset transfer technology.

Two use cases for which MOVE transactions prove to be problematic. The first is "watch as you transfer" (WAYT) or "watch as you sync". "Watch as you transfer" is a feature whereby the content is "used" (presented/displayed) by the sink device as the asset is transferred. But the asset cannot be made usable to the sink device until after all the content associated with the asset has been transferred to the sink device and the COMMITMENT phase is complete. So, the WAYT feature cannot be implemented with DTCP-IP or similar DRMs that use a "usability handoff" to conclude the asset transfer like DTCP-IP MOVE does with the COMMITMENT.

The second use case involves the ability to resume a previously interrupted MOVE based asset transfer. DTCP-IP MOVEs are bound to a unique "move key" (Kxm) which is used in crypto operations on the asset as it is pushed to and from the network medium. DTCP-IP requires that the move key expires if either the source or sink device detects itself being disconnected from the network. To exacerbate the issue with mobile clients, entering into the stand-by state can also cause Kxm to expire. Unfortunately, network disconnection and stand-by state transitions are common occurrences with mobile devices such as smartphones, tablets, and laptops, and can lead to many failed asset transfers. To resume these failed asset transfers, the sink device must establish a new Kxm and retransmit all content which was sent in the prior asset transfer attempt. This can be a highly inefficient (time incurred to retransfer) and a potentially costly way (if paying for bytes transferred (cellular)) to handle potentially large asset transfers.

What is needed is a system and method for transferring copy-protected media assets among devices without the foregoing problems. Such a system and method is described below.

SUMMARY OF THE INVENTION

To address the requirements described above, the present invention discloses a method and apparatus for transferring a media asset segmented into a plurality of media asset segments, from a source device to a sink device, wherein the media asset is associated with a rights object having copy restriction data. In one embodiment, the method comprises (a) establishing a move exchange key for the media asset segment, (b) receiving a command to transfer a media asset segment from the source device to the sink device, (c) determining from the rights object, if the transferring of the media asset segment from the source device to the sink device complies with the copy restriction data for the segment of the media asset and (d) if the transferal of the media segment asset from the source device to the sink device complies with the first media asset copy restriction data, performing operations comprising (d1) updating the copy restriction data of the rights object associated with the media asset segment, (d2) encrypting the media asset segment according to the move exchange key, (d3) transmitting the encrypted media asset segment to the sink device, and (d4) updating usability restriction data of the rights object to indicate that the media asset segment is no longer usable by the source device. Operations (a)-(d) are repeated for each of the plurality of media asset segments. In another embodiment, an apparatus comprises a processor and a memory storing processor instructions comprising instructions for performing the foregoing operations.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The common root of the aforementioned short-comings with asset transfer technology is that the content does not become "usable" early enough in the transfer. If the content became usable early enough, the content could be presented as soon as it is received, thus foregoing the need to retransmit the usable portion because of an interrupted transfer. To resolve this issue, the technique described below makes the content "usable" soon after it is transmitted without waiting for the entire asset to be transferred. In this paradigm, the asset is comprised of many smaller assets (segments or chucks) and a "transfer" comprises many smaller transfers of each segment or chunk. Each of the contents smaller segments are made usable after they complete transfer and a commitment procedure for that individual segment. This allows the content to be rendered or used by the sink device 104 soon as the segment is sent by the source device 102 thus allowing the sink device 104 to implement "offsetted resume of transfers" in the case of failure.

Figure 1:
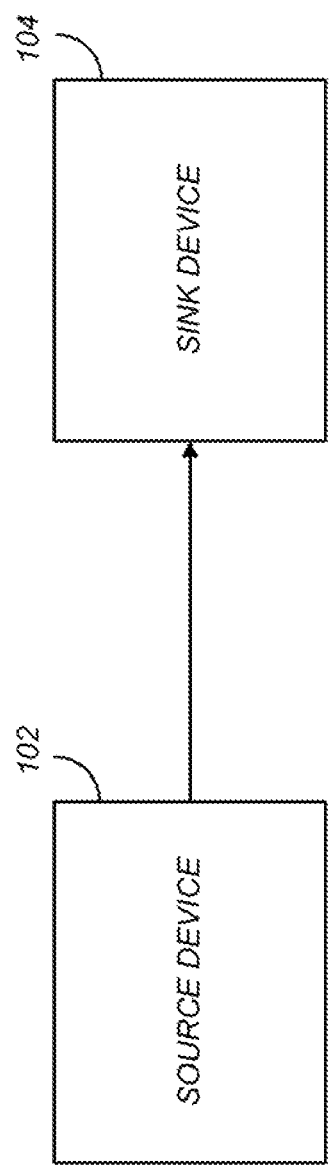
FIG. 1 is a diagram depicting the transfer of a media asset from a source device to a sink device.
Figure 2:
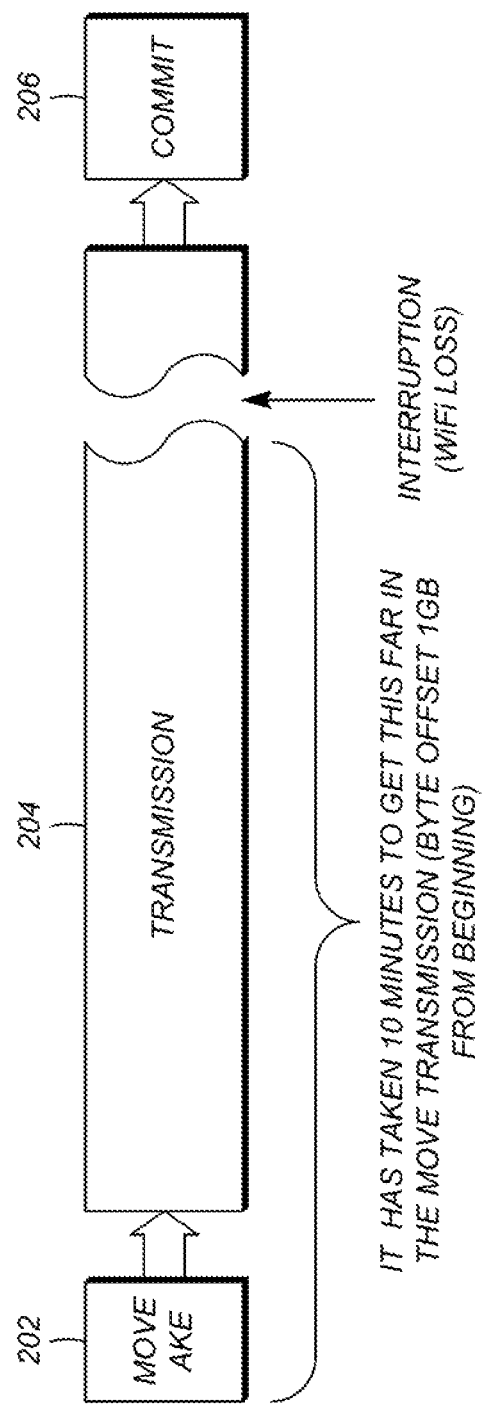
FIG. 2 is a diagram illustrating a prior art transmission of a media asset from a source device to a sink device.

FIG. 2 is a diagram illustrating a prior art transmission of a media asset from a source device 102 to a sink device 104, showing the AKE phase 202, the transmission phase 204, and the commit phase 206. In the illustrated example, the transmission of the media asset itself is interrupted before completion, approximately 10 minutes into the MOVE transmission process. This interruption requires that the entire media asset be retransmitted, and the process begun anew, including the AKE phase 202.

Figure 3:
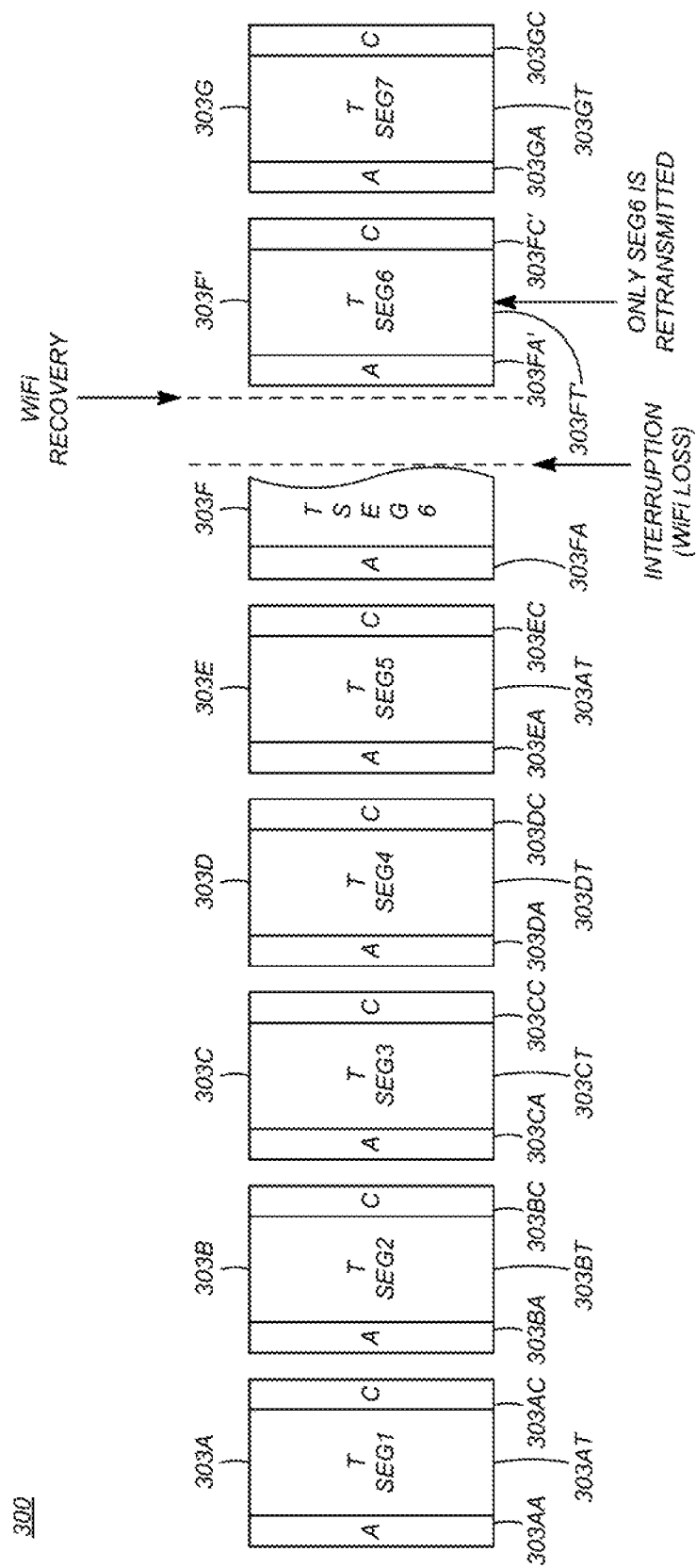
FIG. 3 is a diagram illustrating an improved transmission of the media asset.

FIG. 3 is a diagram illustrating an improved transmission of the media asset. In this embodiment, the media asset 300 is broken into a plurality of segments or chunks 303A-303G (hereinafter alternatively referred to as segment(s) 303). Each of the plurality of segments 303A-303G is transmitted by a respective AKE 303AA-303GA phase and commit 303AC-303GC phase. At the indicated time during the transmission of segment 303F, an interruption occurs, which stops the transmission of segment 303F, for example, because of a WiFi disconnect. When the WiFi is reconnected, segment 303F is retransmitted, and the transmission of the subsequent segments. With this solution, only segment 303F need be retransmitted instead of all of the previous content associated with the media asset. The resumption point may be identified using offsets or segment numbers, for example. Since all segments complete the MOVE operation stage incrementally, the content associated with each of those segments 303 is usable before all of the segments 303 have been transferred. This permits the "play while transfer" or "play as you sync" to be implemented. However, this solution does add the additional overhead of network traffic associated with multiple AKEs, web service interactions, and commitment attempts.

Asset Creation and Storage

Before the transfer of the media asset takes place, the media asset may be persisted in the source device. Such content may be persisted in one contiguous segment (non-segmented form) or in a plurality of smaller segments (segmented form).

For example, pre-transfer persistence in the form of segments may be preferred in embodiments where the segments are listed in an HLS-style manifest or stored in encrypted and segmented form on the sink device 104 after the transfer is completed, because it allows a one-to-one relationship between segments stored by the source device 102 and segments used for the transfer shown in FIG. 2. A data structure defining rights and usable to track the copy counts and usability states of each segment associated with the entire media asset is further described below.

However, pre-transfer persistence in the form of a continuous media asset may be preferred in embodiments where the segments are dynamically defined. This may be the case, for example, if the segments are defined in response to sink device 104 requests, or changing transmission channel characteristics. Such contiguous storage and dynamic segmentation of the media asset is also described below.

Figure 4A:
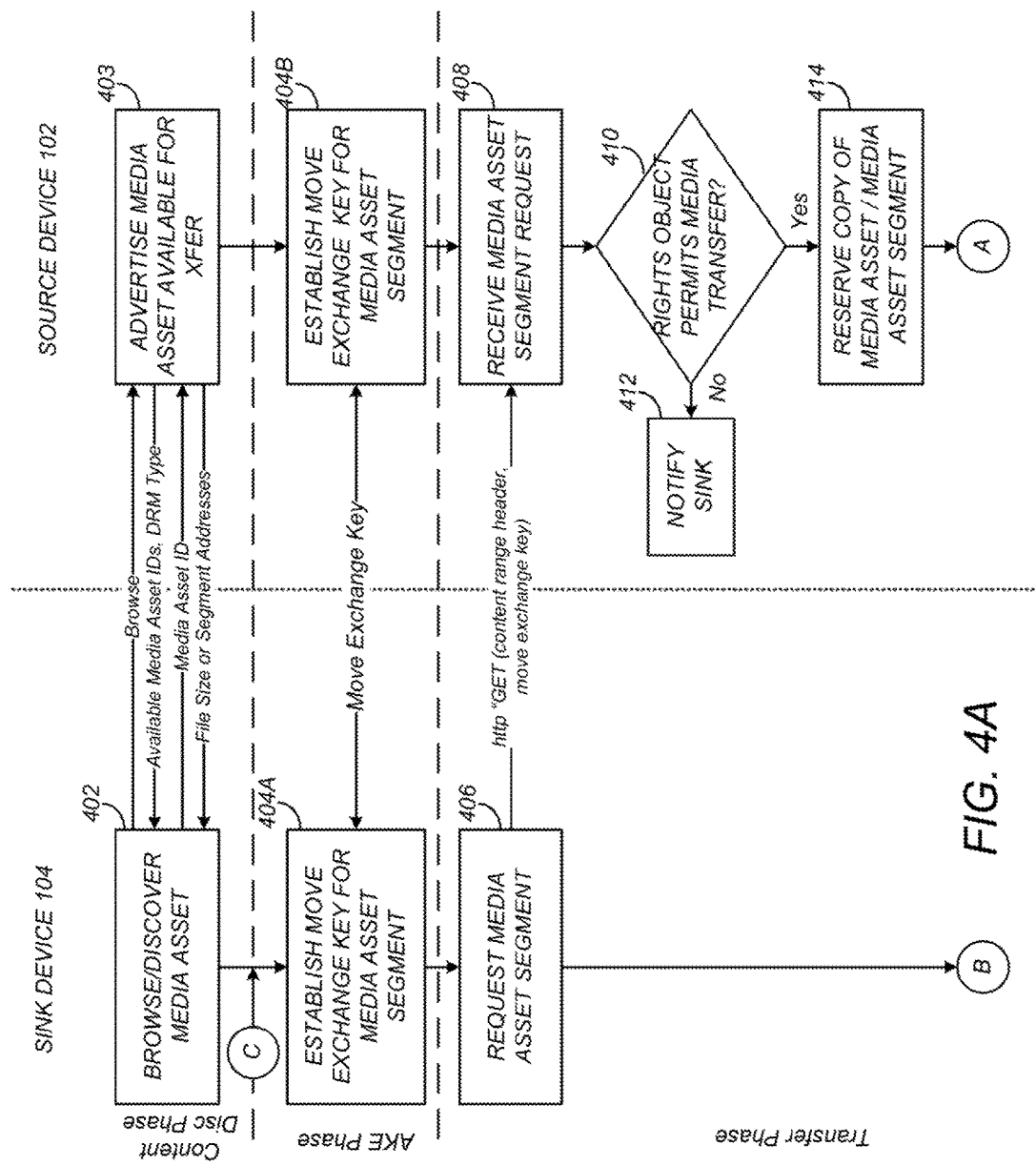
FIGS. 4A-4C are diagrams depicting exemplary operations that can be used to transfer a media asset from the source device to a sink device.
Figure 4B:
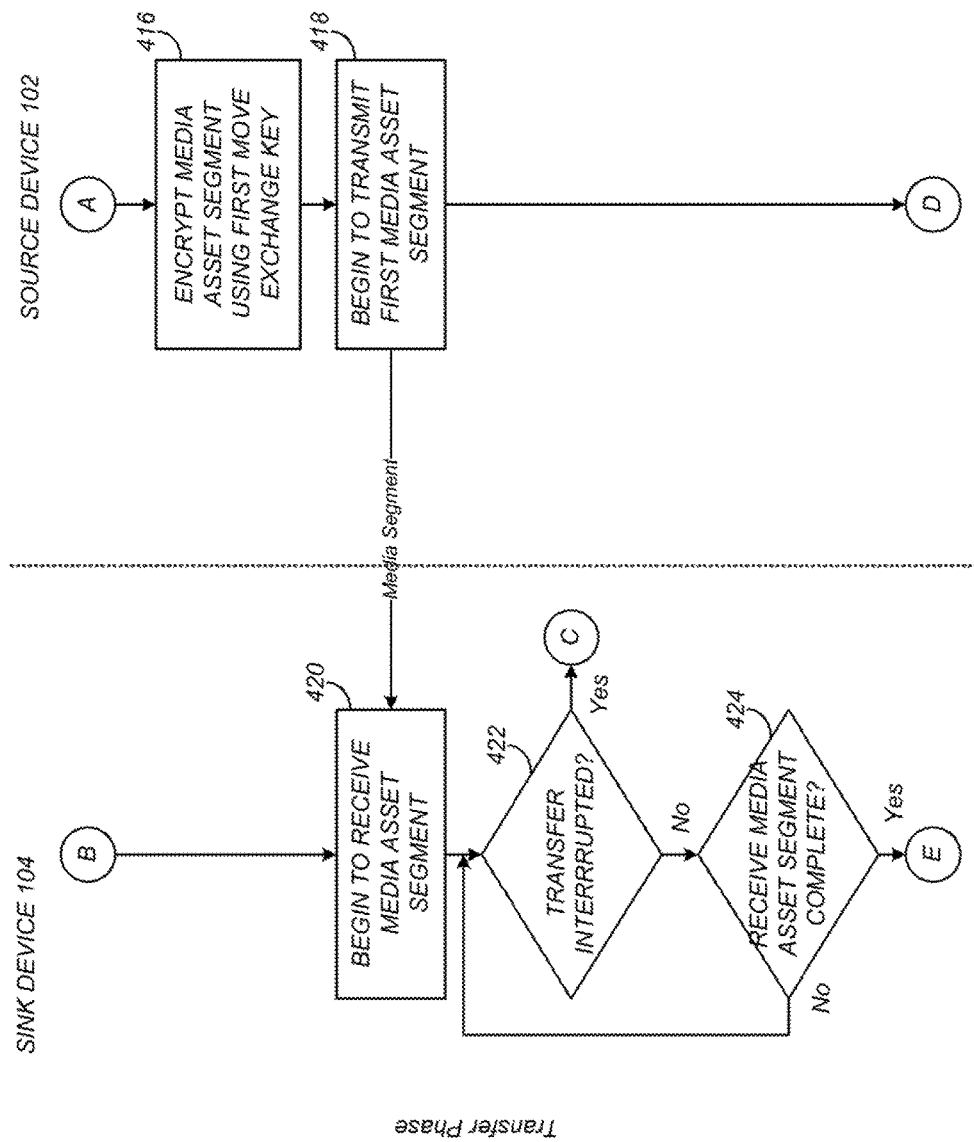
Figure 4C:
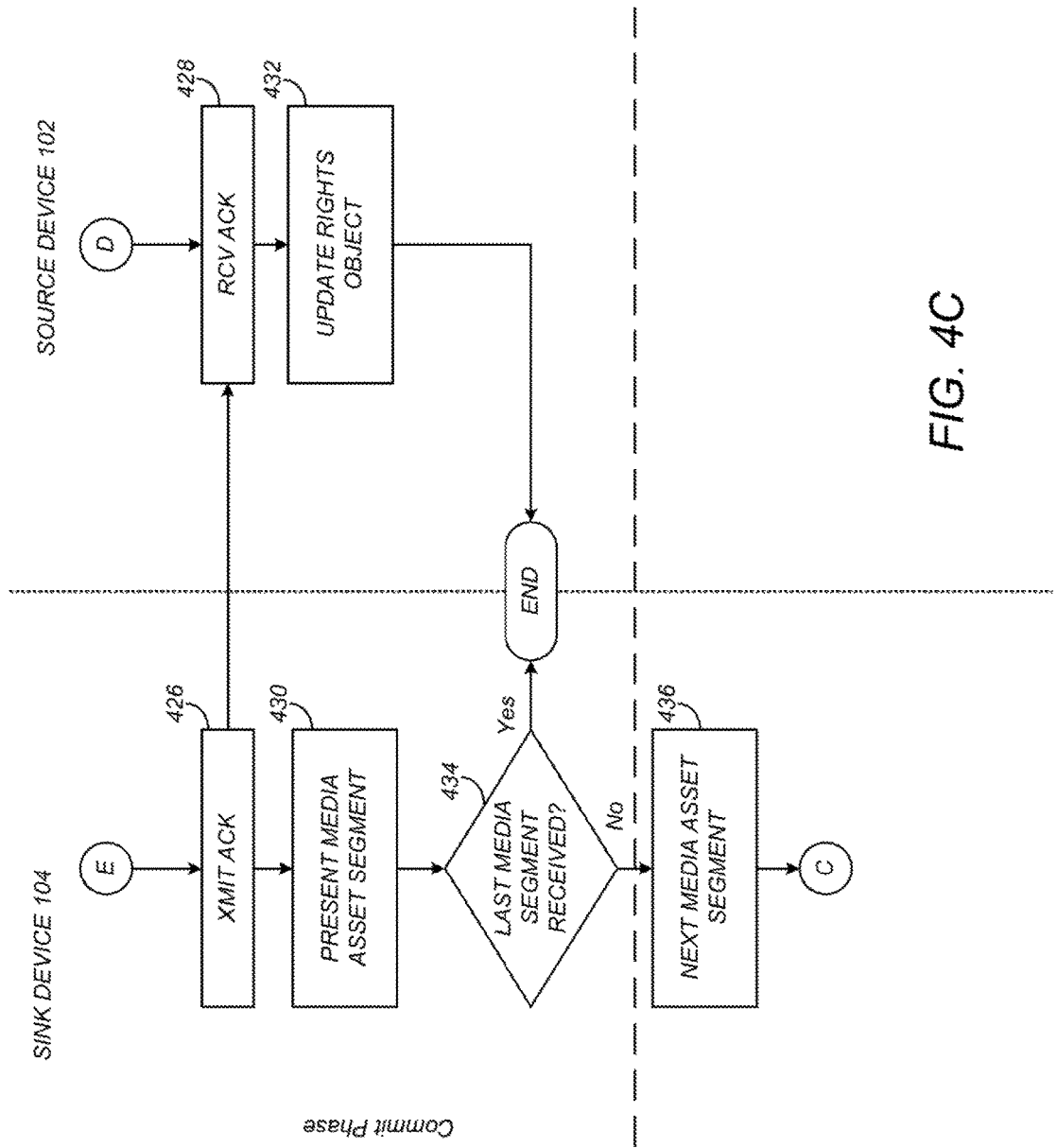

FIGS. 4A-4C are diagrams depicting exemplary operations that can be used to transfer a media asset from the source device 102 to a sink device 104. As illustrated, the transfer of the media asset from the source device 102 to the sink device 104 can be accomplished in three phases: (1) an AKE phase, (2) a transfer phase, and (3) a commitment phase. A content discovery phase, in which sink device 104 discovers transferable media content stored on the source device 102 may also be included.

Content Discovery

In one embodiment, the source device 102 advertises the media asset to potential sink devices 104 as "transferable." Block 402 depicts the sink device browsing or discovering content on the source device. This can be accomplished by transmitting a browse command from the sink device 104 to the source device 102. The source device 102 responds by advertising the media assets available for transfer, as shown in block 403. This information may comprise media asset identifiers (IDs) for each of the media assets available for transfer, and data describing the digital rights management (DRM) protocol used to protect the media asset.

In a Digital Living Network Alliance (DLNA) compliant solution that uses CDS, a "CDS:Browse" action would advertise (1) a uniform resource identifier (URI) that sink device 104 could use to start the transfer of the media asset (2) that the DTCP-IP Digital Rights Management (DRM) is employed in the transfer, and (3) that the content is "Movable" (via the DLNA.ORG_FLAGS parameter). The details of the implementation, regarding whether the content was segmented or not on the source device, is hidden from the sink device 104. Therefore, if it is desired to leverage the segmentation of the content on the source device 102, standardized interfaces are not impacted, nor do they create a non-compliant solution according to DLNA or Digital Transmission Licensing Administrator (DTLA) specifications. If segmentation is supported for a particular media asset, the source device 102 may also advertise that capability. If DLNA is used, this capability could be advertised by indicating content-range support in the protocol info field for the media asset at the time of discovery.

The sink device 104 may then request a selected one of the media assets for transfer by transmitting the media asset ID, address, or other descriptor of the desired media asset to the source device 102. The source device 102 responds by providing information required to transfer the media asset from the source device 102 to the sink device 104.

In one embodiment, this information includes the memory address or offset for each of the segments that together comprise the media asset. In another embodiment, this information comprises a logical file size of the media asset (e.g. in megabytes), which the sink device 104 uses (along with a count of the bytes already transferred to the sink device 104) to determine the memory address or offset of subsequent segments to be transferred.

Authentication and Key Exchange (AKE) Phase

In the AKE phase, the source device 102 and the sink device 104 authenticate one another, and establish a move exchange key necessary to transfer the first segment of the media asset, as shown in blocks 404A and 404B. The move exchange key is used to protect the media asset by encrypting the media asset segments by the associated exchange key before transfer. Once the segment is received by the sink device 104, the transferred segment may be decrypted by the sink device 104 using the move exchange key. This encryption and decryption with move exchange keys may be provided in addition to the encryption of the media content itself.

In the case that the media asset is advertised by the source device 102 as being protected by DTCP-IP DRM, the sink device 104 must establish a move exchange key with the source device 102 before the sink can begin the transfer of the media content. Two authentication levels may be offered to assure scalability and to provide for different media asset protection implementations: (1) full authentication can be used for all media assets and is required for media assets designated to forbid copying (e.g. marked "copy never"), and (2) restricted authentication, which enables protection of the media asset when the asset designated to permit only single generation of copies. After authentication, the source device 102 and the sink device 104 generate and/or exchange the following keys: (1) an authentication key, which is formed as a result of the above-described authentication process and used to protect the exchange keys during the key exchange process, (2) exchange keys, which are used to set up and protect media assets in transfer via encryption using the exchange keys, and content keys, which are used to encrypt the media asset and/or segments.

Transfer Phase

In block 406, the sink device 104 issues a command to request to transfer the temporally first segment of the media asset to the source device. The request comprises information sufficient to ascertain which segment of which media asset is to be transferred.

In one embodiment, the request comprises an identifier of the media asset segment itself. In another embodiment, the request comprises an identifier of the media asset, and the address of the desired segment (which may comprise a memory offset). The request may also comprise an identifier of the move exchange key that the source device 102 will use to encrypt the media asset segment before the segment is transferred. Other embodiments may simply infer that the media exchange key most recently established (in blocks 404A and 404B) will be used to encrypt the media segment before transfer.

Media asset segment requests can be issued in a DLNA compliant fashion via HTTP "GET" command with a URI which corresponds to the media asset segment of interest that was advertised as detailed in the above "Content Discovery" discussion. In compliance with the DTCP-IP specification, the move exchange key identifier that is desired to be used with the transfer should be communicated to the source device in the HTTP "GET" request. If the "GET" command specifies the URI of the entire media asset instead of the first media asset segment, the GET command may include a Content-Range header that specifies the starting byte offset of the first media asset segment.

As described further below, if the transfer of the segment of the media asset is interrupted, the transfer can be resumed by the client by issuing another HTTP GET command for the desired segment. In embodiment wherein the HTTP GET command includes the Content Range header, the header specifies the starting byte offset of first segment of content not yet successfully transferred. In this embodiment, the sink device performs asset transfer byte-counting so that the offset of the first un-transferred segment can be determined and used in the repeated HTTP GET command. In one embodiment, the sink device 104 implements this offset tracking by maintaining a "currentSegmentStartOffset" variable and updating this variable to the offset of the (last byte+1) of the last segment to successfully complete the MOVE COMMITMENT process described below. Other media asset transfer protocols other than DLNA may be used, and should support either direct references to individual media asset segments or should support mechanisms that specify the media asset and byte offset for each segment.

Content Transmission

In block 408, the source device 102 receives the command or request to transfer the media asset segment. The source device 102 responds to the segment request by determining if the requested media segment is permitted to be transferred to the sink device 104, as shown in block 410. This is accomplished with reference to a rights object having copy restriction data for the media asset segment. To support a "watch as you transfer" capability (allowing a user of the source device 102 to view the media asset segment while it is being transferred to the sink device 104), the rights object includes a media asset maximum copy value that can be used to specify the maximum permissible number of copies that can be made of the media asset segments as well a copy count describing the number of media asset segment copies actually made. Also included to support this functionality is a flag or other value that indicates which of the two devices (the source device 102 or the sink device 104) is currently permitted to "use" the media asset segment.

It is also desirable that the rights object support multiple media asset versions (or profiles). This is useful if it is desirable to support a system such as HLS, wherein different version of the media asset are available, each encoded to be optimized for different transmission channel or sink device 104 characteristics. This allows the source device 102 to deliver the content to a number of different sink device types over a variety of transmission channel characteristics. For example, a first profile of the media asset may be encoded in high resolution and a rapid frame rate and may be transmitted on channels for real time or near real time consumption on a high bandwidth transmission channel. A second profile of the media asset may be encoded in medium resolution at a medium frame rate for standard bandwidth transmission channels, and a third profile of the media asset may be encoded in low resolution at a lower frame rate for consumption on a low bandwidth channel (or by a device that cannot reproduce the detail or frame rate of the first or second profile versions of the media asset).

In the simple example discussed above, each media asset segment includes a maximum copy value, a copy count and a flag indicating whether the media asset segment is usable by the source device 102.

Figure 5:
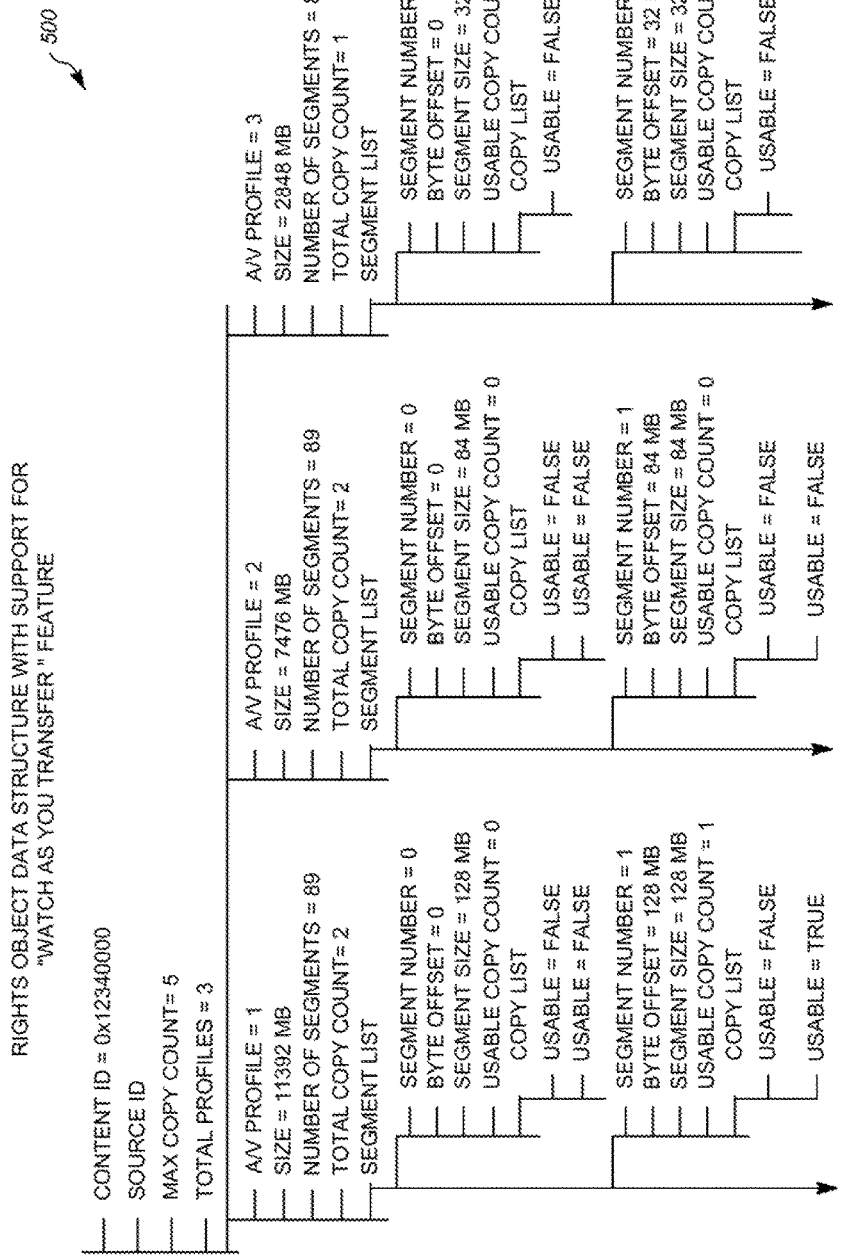
FIG. 5 is a diagram illustrating an exemplary embodiment of a rights object.

FIG. 5 is a diagram illustrating an exemplary embodiment of a more complex rights object 500 that supports the above identified desired feature set. The illustrated instantiation is managed and maintained by the source device 102, and is tracking 5 copies (the maximum permitted number of copies) of a media asset having a media asset ID of 0x12340000 across three different A/V profiles.

The first A/V profile (A/V Profile=1, also referred to as Profile 1) refers to a first profile of the media asset. As indicated, Profile 1 has a size of 11,392 kilobytes, and includes 89 segments. As indicated by the Total Copy Count variable for Profile 1, two of the five permitted copies of the media asset have been allocated to Profile 1. The segment list provides an ordered list of the segments of the media asset, including the segment number, the byte offset for the beginning of the segment, the size (in bytes) of the segment, and the number of usable copies of that segment that are currently available. A copy list is also included for each of the copies of the total copy count assigned to the profile. In the illustrated instantiation, the total copy count allocated to Profile 1 is two, so there are two members to the copy list for each segment of the media asset. The copy list itself includes a flag value for each copy of the total copy count for each segment of the particular profile of the media asset.

For example, the rights object shown in FIG. 5 includes a total copy count of two for Profile 1, thus indicating that two of the five permitted and available copies of the media asset have been allocated to Profile 1. The copy list of segment 0 of Profile 1 indicates that both copies of segment 0 of the Profile 1 version of the media asset are unusable. This indicates that the source device has transferred two copies of segment 0 of Profile 1. Since the total copy count for Profile 1 of the media asset is two, that leaves zero usable copies of segment 0 of profile 1 for use by the source device 102. The copy list of segment 1 of Profile 1 indicates that one of the copies of the segment is still usable by the source device 102 (usable=true), thus indicating that segment 0 has either not been transferred as of yet, or is in the process of being transferred to the sink device 104. With regard to Profile 1, only two segments of content out of 89 total are shown for simplicity and to keep the diagram a reasonable size.

In the illustrated rights object 500, two copies of the available five copies of the media asset have been allocated to Profile 2 (A/V Profile=2), and have been transferred from the source device 102. This is indicated by the rights object 500 by a comparison of the total copy count for Profile 2 (two) and that the flags indicting the usability of the copies of segments 0 and 1 are both indicated as "false" (indicating that those copies have already been transferred elsewhere). This is also indicated by the "usable copy count" value of 0 for both segment 0 and segment 1 of Profile 2. Finally, one copy of the media asset has been allocated to Profile 3 (A/V Profile=3), and this copy has already been transferred from the source device 102 to another device.

In the exemplary embodiment of the rights object 500 of FIG. 5, segment sizes have been chosen to reflect an appropriate granularity of segmentation based on viewing length of each segment for each encoding type. For example, all segments, independent of A/V profile, take roughly 3 minutes to present at normal playback speed. Finer segmentation granularity can be attained at the cost of increased "commit" and "AKE" overhead.

Returning to block 410 of FIG. 4, the copy restriction data in the rights object 500 is used to determine if a media transfer is permitted. If the exemplary rights object 500 of FIG. 5 is used, the maximum copy count of the media asset (which has a value of 5) is compared with the sum of the total copy counts for each of the A/V profiles (2+2+1=5). This indicates that no further copies of the media asset may be transferred, and processing is routed to block 412, which optionally transmits a message to the sink device 104 to indicate that all of the permitted copies of the media asset have been transferred. If the sum of the total copy counts for each of the A/V profiles was less than the maximum copy count, processing is routed to block 414, which reserves a copy of the media asset (or media asset segment). This can be accomplished by updating copy restriction data of the rights object 500 associated with the media asset or segment.

For example, referring to the rights object 500 of FIG. 5, if the maximum copy count were equal to 5, and the total copy counts for A/V profiles 1, 2, and 3 were 1, 2, and 1, respectively, this would indicate that a copy is available for transferring to a sink device (as 5>1+2+1). Once the source device 102, using the rights object 500, has determined that a copy is available for transfer, the source device 102 may increment the total copy count for the requested A/V profile (in the illustrated example, A/V profile 1), and thereafter make other changes to the rights object. Since the total copy count for all of the A/V profiles now equals the maximum copy count of the media asset (5), no further copies can be transferred. Since this happens before the media asset segment(s) are actually transferred to the sink device 104, the media asset or media asset segment(s) are said to be reserved. Also, once another copy is allocated to a particular A/V profile, the "usable flags" for the each associated copy of segment of the A/V profile should be added to the segment's copy list, with a default value of "true" (indicating that the source can still use the segment of the A/V profile of the media asset. Each instance of the "usable" variable in the "copy list" signifies a copy in progress or a completed copy transfer. Immediately after reservation of the last remaining media asset (to Profile 1), the rights object 500 would be as it appears in FIG. 5, except the second usable flag for the first segment (corresponding to the second copy of the first segment of Profile 1 of the media asset) would be true (because its transfer to the sink device has not been completed, and is hence usable by the source device 102).

Note that using the exemplary rights object 500, a routine must traverse the list of A/V profiles and add up the "total copy count" values and subtract that from max count value to determine the number of copies remaining to transfer. In another embodiment of the rights object includes a specific declared value for "rights transferred."

Once the source device 102 has determined that a copy of the media asset is available for transfer and has reserved that media asset, processing is routed to block 416 of FIG. 4B, which illustrates that the first media segment of the is encrypted using the move exchange key established in blocks 404A and 404B. In blocks 418 and 420, the source device 102 begins transferring the media asset segment, and the sink device 104 begins receiving the media asset segment. At this time, the usable flag in the copy list for segment 0 of Profile 1 of the rights object 500 for the media asset is "true," indicating that the segment 0 of Profile 1 of the media object is still usable by the source device 102.

Block 422 determines whether the transfer of the media asset segment has been interrupted. This could occur, for example, because of a break in the transmission channel used to transmit the segment, or a failure on the part of the source device 102 or the sink device 104. If the transfer was not interrupted, processing is routed to block 424, which determines whether the reception of the media asset segment is complete. If the transfer is not complete, processing is re-routed to block 422.

Commitment

The final phase of segmented asset transfer is the transfer commitment. In embodiments using DTCP, this phase is referred to as the MOVE commitment phase. After each segment is transferred, the sink device 104 should initiates the transfer commitment. This phase is needed to maintain the integrity of the copy counts. The commitment ensures that only one usable copy of a segment exists at one time. After successful completion of the commit phase, the segment has completed transfer to the sink device. This is shown in FIG. 4C wherein if the transfer is complete, processing is routed to block 426, in which the sink device 104 transmits an acknowledgement message to the source device 102 to indicate that the transfer of segment 0 of the media asset has been completed. The sink device 104 may now decrypt the media asset segment using the move exchange key and may present the media asset segment just transferred, as shown in block 430.

Optionally concurrently with such presentation, the source device 102 receives the acknowledgement message, as shown in block 428 and updates the rights object, as shown in block 432. In embodiments using a simple rights object 500, usability data the rights object for the segment is updated to indicate that the media segment has been transferred and is no longer usable by the source device. For example, using the rights object 500 such as illustrated in FIG. 5, the "usable" flag of for the second copy of segment 0 of Profile 1 of the media asset is set to "false" to indicate that segment 0 has been completely transferred to the sink device 104 and is no longer usable by the source device 102.

Returning to FIG. 4C, block 434 determines if the last media segment has been received. This may be determined by the sink device 104 using the memory offset of the most recently received media asset segment (comparing that value with the total file size of the media asset, or in embodiments where each media asset segment is referred to by a different URI, by noting that the media asset segment having the last URI of the requested media asset has been received. If the last segment of the media asset has been received, processing terminates. But if the last segment of the media asset has not been received, processing is routed to 436 to identify the next media asset segment for reception, and thereafter to block 404A to establish a move exchange key for that next segment, and the process begins anew for the second segment of the media asset.

Before the sink device 104 can receive the next segment, a new move exchange key for that transaction (represented by the 303BA portion of the segment in FIG. 3). The move exchange key for the second segment is established, as shown in blocks 404A, 404B.

Once the move exchange key is established, and a request for the second media asset segment is transmitted as shown in block 406. Since the second segment is now desired, this request identifies the second media asset segment (either by identifying the address or URI of the segment or the address or URI of the media asset and the offset of the second segment, for example by a byte offset in a Content-Range header).

This can be accomplished by issuing another HTTP GET request for the media asset, but this time the DLNA byte-range offset field is used. The byte-range offset field is used here to communicate to the source device 102 which segment to resume the transfer from. In one embodiment, the start of the range indicates the offset of the start of the segment as it relates to total size of the copy (the "size" property of the A/V profile in the rights object).

The source device 102 receives the request, and determines if the rights object 500 permits the transfer of the requested segment of the media asset. In the simple case wherein the rights object 500 includes a maximum copy count and count of the segment transferred on a segment by segment basis, this can be determined by simply comparing the maximum copy count and the copy count. In the more complex embodiment of the rights object 500 illustrated in FIG. 5, this can be performed by verifying that the usable copy count for the second segment (segment 1) is at least one.

Media assets may be reserved on an asset by asset basis (thus reserving all media segments in the asset) or on a segment by segment basis (in which each is reserved one at a time). Then, in block 414 (illustrating an embodiment where the media asset segments are reserved one at a time), a copy of the media asset segment may be reserved, for example, by decrementing the copy count for the second segment by one. The source device 102 then encrypts the media asset segment using the second media exchange key and begins transmitting the media asset segment, as shown in blocks 416 and 418.

The meaning of the variables and flags depicted in the rights object 500 of FIG. 5 being explained, the current state of media asset transfers for the illustrated values of the rights object 500 will now be explained. Although the copy lists for all 89 segments of Profile 1 are not illustrated because of size limitations of the FIG. 5, all segments for copy 1 of Profile 1 of the media asset have been transferred to the sink device 104 (as indicated by the first "usable" flag in each segment's copy list being set to false (thus indicating the source device can no longer use any of the segments of Profile 1 of the media asset).

With regard to the segments of copy 2 of Profile 1 of the media asset, the rights object 500 shows that the segment 0 of copy 2 has been transmitted to the sink device and is now playable on the sink device (the second "usable" flag is set to false indicating that segment 0 of copy 2 of Profile 1 of the media object has been successfully transferred from the source device 102 to the sink device 104). The sink device 104 can now begin presentation of segment 0 assuming bandwidth conditions allow a second segment to be received before all the content from segment 0 is presented. In one embodiment, flow control logic implemented by instructions stored on the sink device 104 and executed by a sink device 104 processor can make this determination based on the bitrate of the content, the average bitrate realized from the previous transfer, and the size of current segment and the size of next segment to be transferred.

Again, the source device responds to the most recent HTTP GET command with a protect copy package (PCP) or stream of PCPs (this phase is represented by the 'T' portion 303B of the segment in FIG. 3). Referring again to the rights object 500 of FIG. 5, that the previous "usable" flag for copy 2 in segment 0 is "false", and that the next segment's "usable" flag for copy 2 is "true" indicates that a media asset transfer in progress and segment 1 is currently being transferred.

Referring to block 422 of FIG. 4B, we now assume that the transfer of segment 1 of Profile 1 of the media asset is interrupted between byte offsets of 128 MB and 256 MB (for example, after 200 MB s of the media asset have been transferred). Normally, all content between offset 0 and 200 MB would be discarded and would have to be retransmitted (for example, via another HTTP GET command. However, block 422 routes processing back to block 404A to establish a move exchange key and re-request the interrupted media asset segment to begin transfer of the interrupted media asset segment.

Contiguous Content Storage

In the foregoing discussion, it was assumed that the source device 102 had pre-segmented the media asset before the transfer request from the sink device 104. If content is not pre-segmented (e.g. stored in contiguous form on the source device) implementation of the "Interruptible Copy Counted Transfer" and "watch as you transfer" features requires that a contiguously stored file be logically (as opposed to physically) segmented so that the transfer of the media asset can be broken up into smaller transfer segments.

Figure 6A:
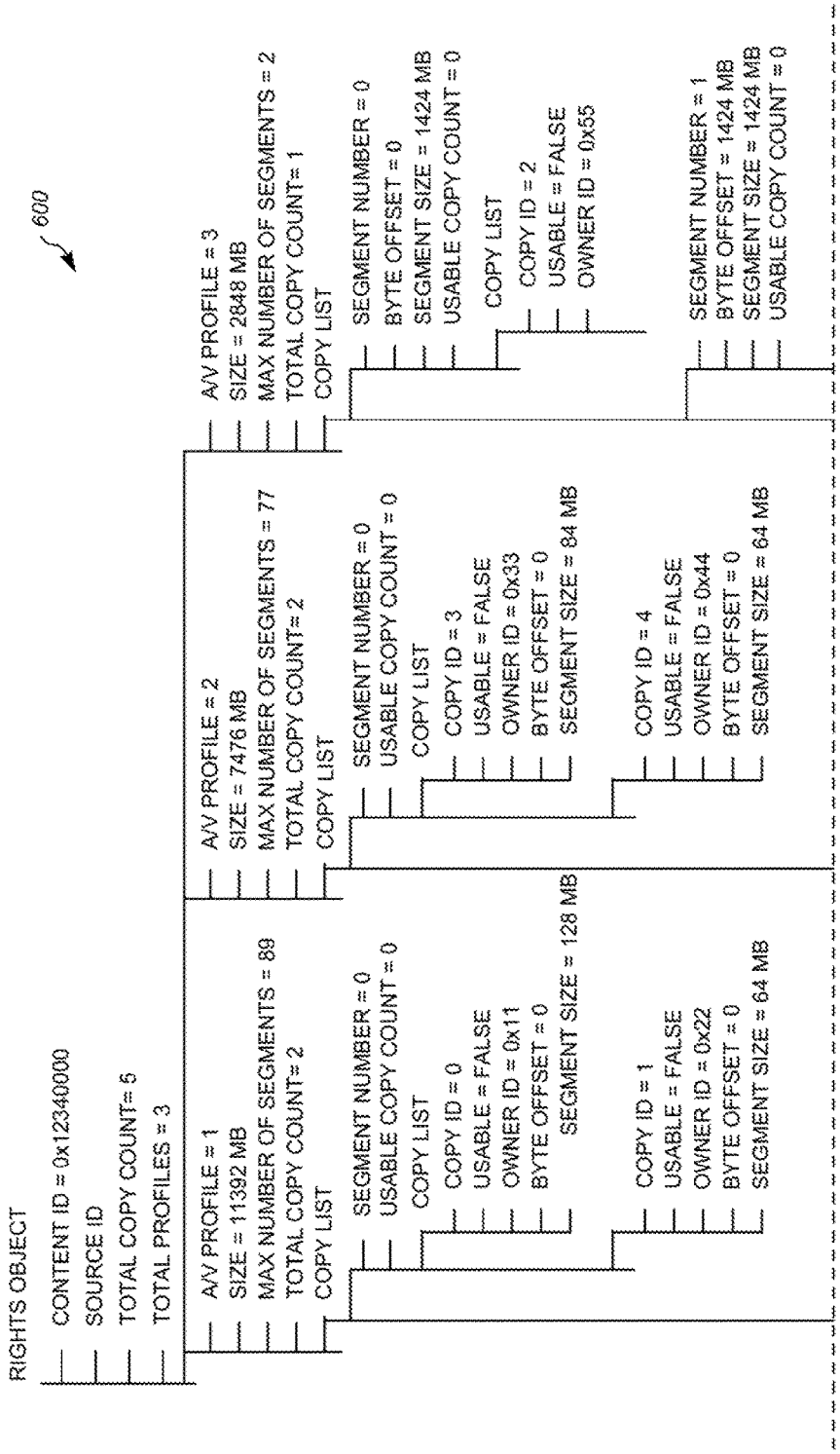
FIGS. 6A and 6B are diagrams of another embodiment of a data structure of a rights object supporting on-the-fly segmentation.
Figure 6B:
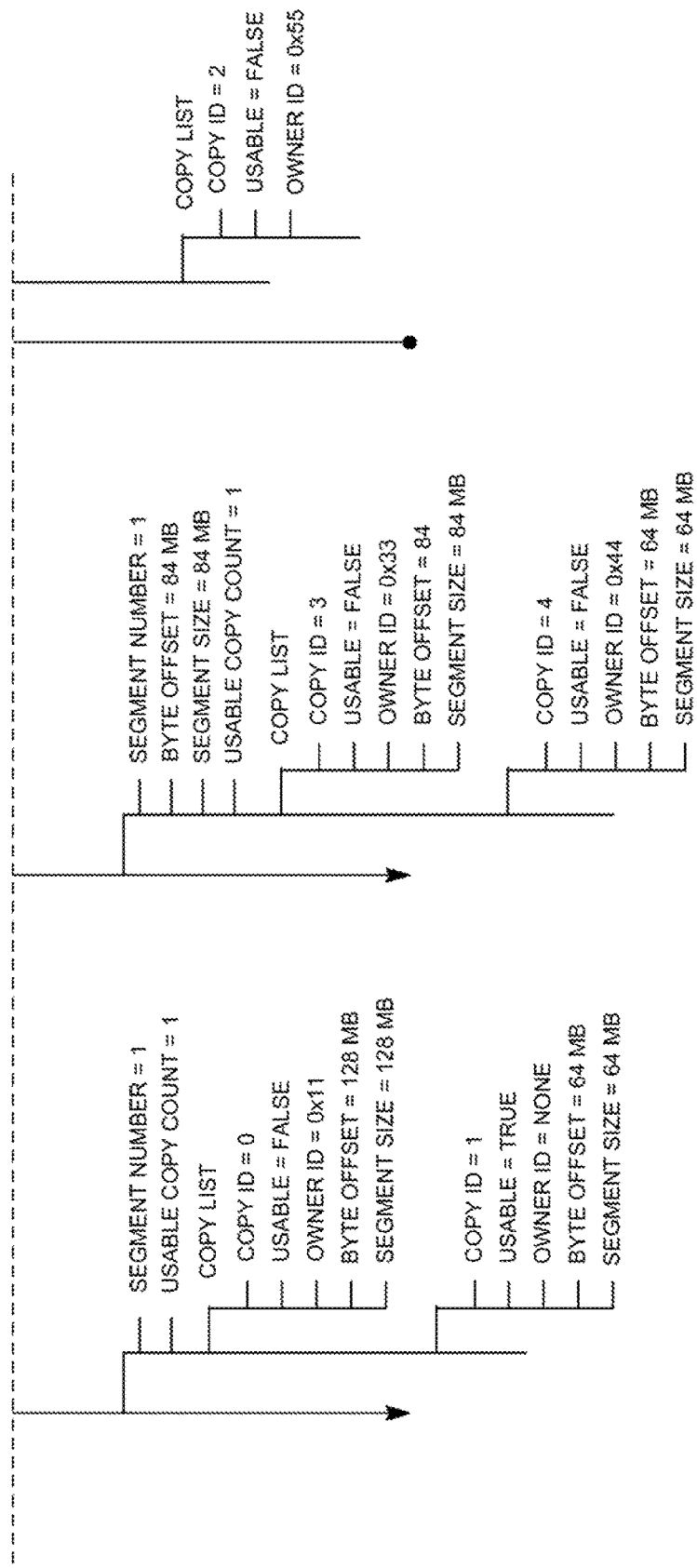

FIGS. 6A and 6B provide a diagram of another embodiment of a data structure of a rights object 600 supporting on-the-fly segmentation. In addition to the items supported with the solution that was devised for pre-segmented media assets, logical segmentation of continuous content can also support (1) On-the-fly logical segmentation, in which the source device 102 defines the segment sizes for a copy of a media asset as it is transferred. With this feature, the sink device 104 controls the size of the segments for its particular copy of an asset; (2) Unique device ID based copy ownership—this will facilitate the ability of the source device 102 to manage copy counts; (3) reservation, by the source device 102, of only one copy of the media asset for a particular sink device 104, even though multiple requests for the media asset originate from the same sink device 104, thus preventing the copy count from being decremented with each segment transferred to a sink device 104; and (4) implementation, by the source device 102 of a feature where a specific number of allowed copies are permitted for transfer to a particular sink device as part of a custom rights policy.

Recalling that the rights object 500 depicted in FIG. 5 supports (1) Content properties (unique ID for media asset, max number of copies for media asset); (2) Multiple A/V profiles per media asset; (3) multiple media asset segments per A/V profile (segmented content) and (4) multiple copies per segment. This data structure can be leveraged to define a rights object that supports storage of media assets in segmented and/or contiguous forms.

Figure 7:
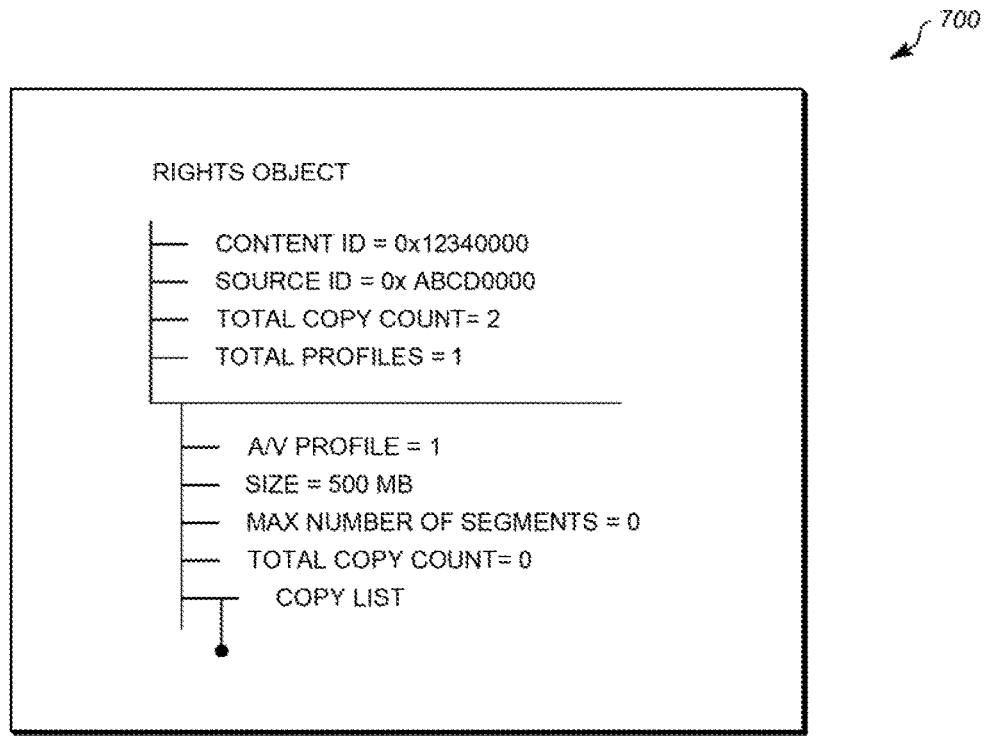
FIG. 7 is a diagram illustrating the a preconditioned state of a data structure for the rights object supporting on-the-fly segmentation.

Consider a transfer scenario with the following preconditions: (1) a "copy counted" high value asset exists on the source device 102; (2) no copies have been transferred to a sink device 104 as of yet; (3) only one A/V profile exists for the asset; (4) a rights policy that dictates that a maximum of two copies can be transferred to sink devices 104 for this particular media asset; (5) the sink device 104 has discovered that the media asset is available for transfer from the source device. These preconditions yield the data structure of the rights object 600 shown in FIG. 7.

The sink device 104 now requests to transfer a copy of the media asset from the source device 102 to the sink device 104. If DLNA is being used, an HTTP GET with a specified content-range is issued by the sink device 104.

In making this request, the sink device 104 first determines a desired segment size. This can be determined, for example, from an average bit rate, and the size of the media asset. For example, the sink device 104 may determine that the average bit rate of the communication channel between the source device 102 and the sink device 104 is 700 KBps. The sink device 104 observes the reported file size of the asset is 500 MB (via DLNA CDS mechanism or HTTP HEADER info) and the average bit rate of encoded media asset is 500 KBps (MPEG 2 standard definition (SD) encoded content). The average bit rate of the media asset can optionally be provided via the DLNA CDS.

Further assume that the user of the source device 102 wants to utilize the "watch as you transfer" capability so that the media asset remains viewable on the source device 102 until it is transferred to the sink device 104 (e.g. a mobile device), and that the sink device 104 would like the presentation of the content to be robust enough to be able to withstand 1 brief network disruption per minute. Not factoring in transport overhead or buffering considerations, the sink device 104 determines that it needs 30 MB of data per minute to be able to seamlessly present the content. Given the network performance (42 MBps), the sink device 104 determines that there is an excess of 12 MB of data per minute that it can use to retransmit any segments in case of network disruption. Based on this analysis, the sink device 104 can determine that it needs to logically segment the content where 1 segment=(30 MB (total data needed per minute)/4). This yields a segment size of 7.5 MB. In case one segment needs to be fully retransmitted per minute, there will still be 4.5 MB of data left which should be enough to account for network, MPEG and AKE/commit overhead. AKE and MOVE commit should account for ~200 ms of network usage per segment. Since up to 5 segments will be transmitted per minute, there could be up to 1000 ms (5 segments*200 ms) of AKE overhead. In this network, 1000 ms of time equals 700 KB of data. Given that there is 4.5 MB per minute of unutilized bandwidth, 700 KB of segmentation overhead (AKE/MOVE commit overhead) can be absorbed with impunity (seamless video presentation can still be achieved).

So, now client must determine the range for its first segment. Since each segment will be 7.5 MB, the range of the first segment will be 0 to 7.5 MB. The client issues the HTTP GET request with a range of 0 to 7.5 MB to the source device 102 and segment transfer begins.

The source device 102 receives the media asset request (block 408) and determines if the rights object permits the transfer of the media asset. Since the total (maximum) copy count of the media asset is 2 and the total cop count of the A/V Profile is zero, the source device 102 will determine that the rights object 700 permits transfer of the media asset, and the copy of the media asset can be reserved, for example, by incrementing the total copy count from 0 to 1. The rights object 700 is then augmented with a copy list for each segment to be transferred.

The copy list includes a segment number, usable copy count, and a copy list for each copy of the segment, which comprises a copy identifier, usable flag, Owner ID, byte offset, and segment size. Note that the "Owner ID" field is populated with a value that uniquely identifies the device transferring the segment. If DLNA/DTCP-IP is used, the DTLA device ID could be used as the unique identifier.

Figure 8:
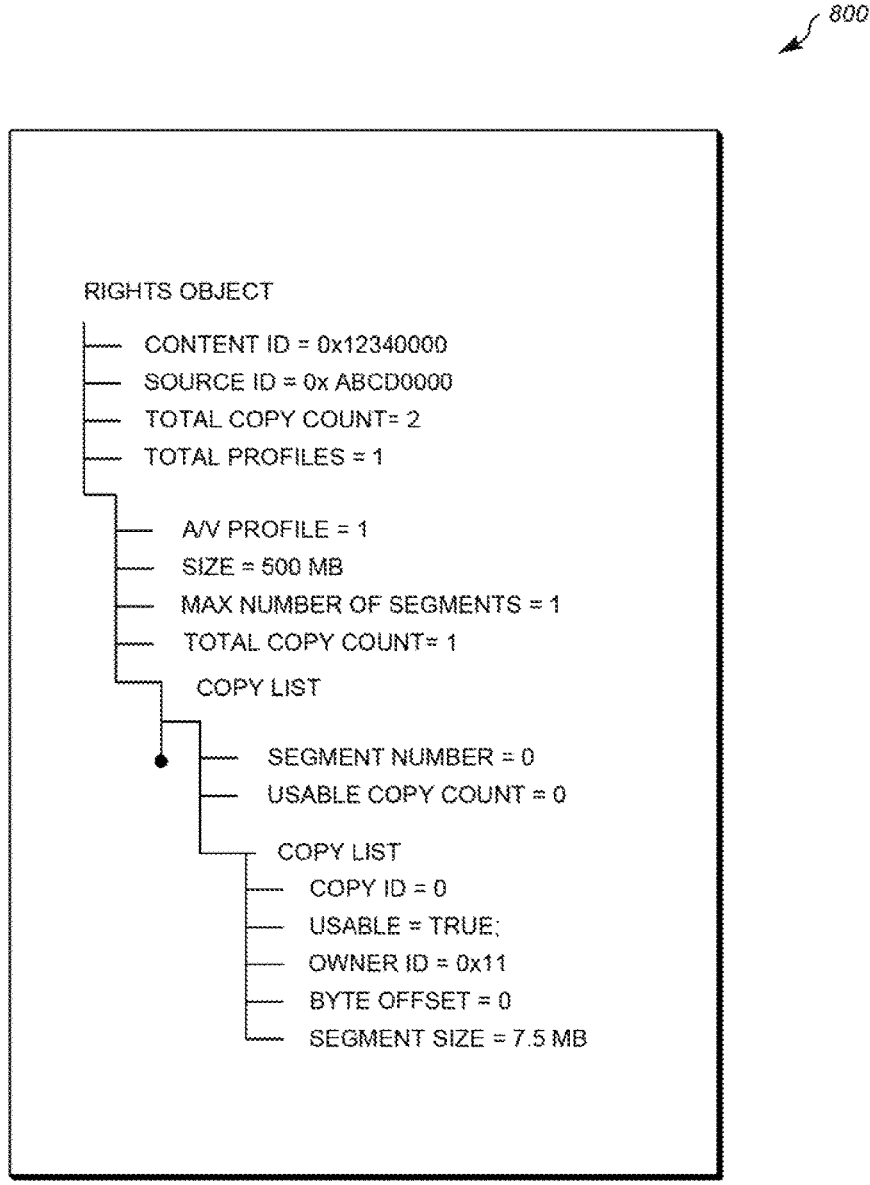
FIG. 8 is a diagram illustrating the state of the rights object during segment transfer.

FIG. 8 is a diagram illustrating the state of the rights object 800 during the segment transfer. Note that since the segment has not been completely transferred to the sink device 104 and acknowledged, the segment is still usable by the source device 102 (as indicated by the usable flag being set to true. After all the bytes in the first segment are received, the sink device initiates the MOVE COMMIT process to update the rights object (block 432), after which the segment is now presentable by the sink device. After successful transfer of the media asset segment, the rights object is updated (block 432).

Figure 9:
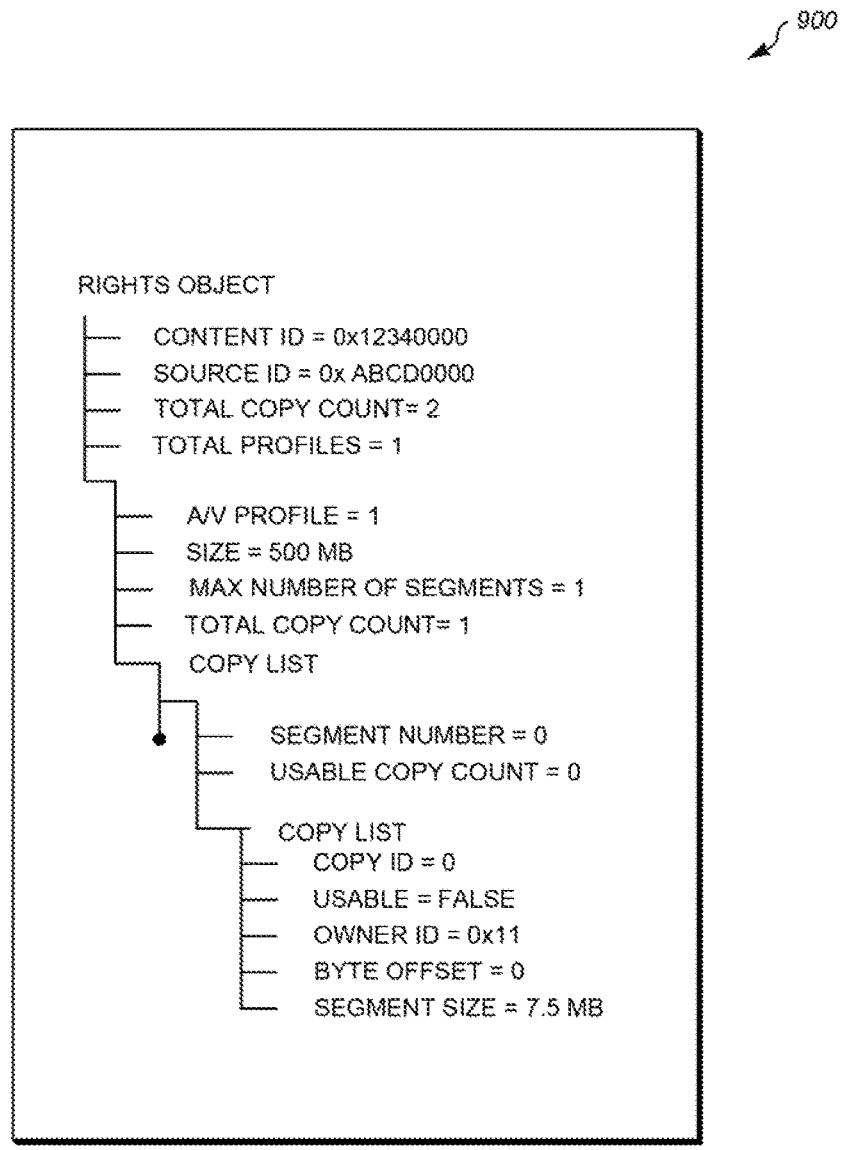
FIG. 9 is a diagram illustrating an embodiment of the updated rights object.
Figure 10:
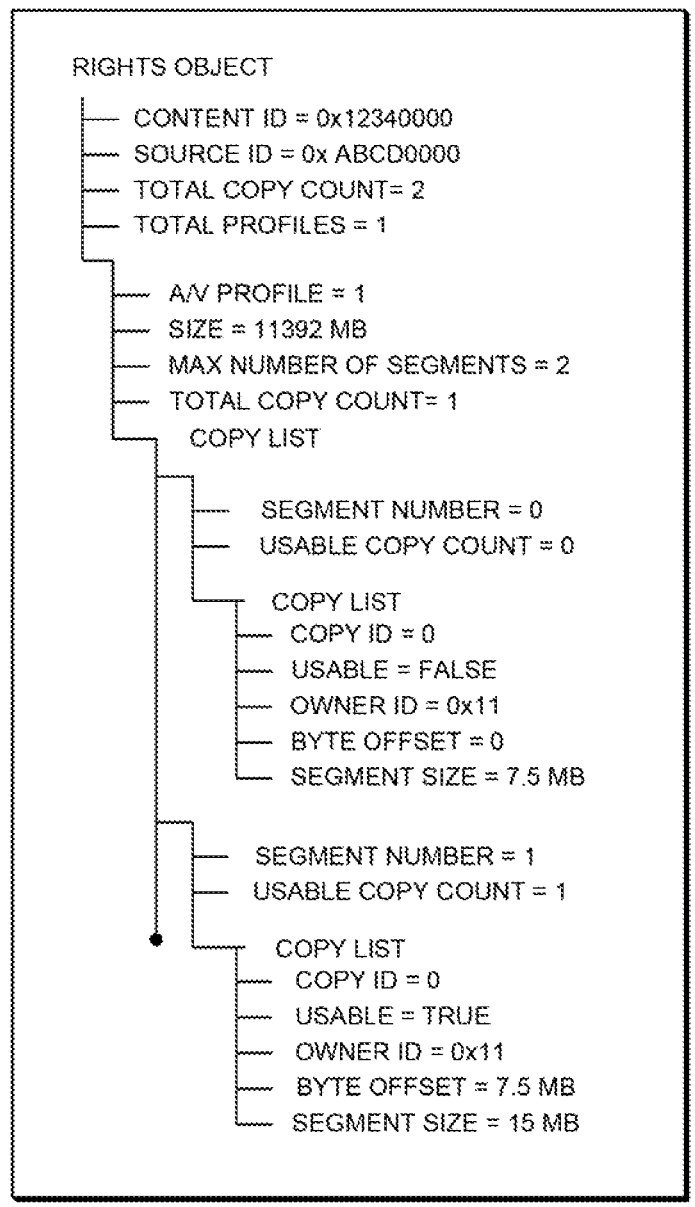
FIG. 10 is a diagram illustrating an embodiment of the updated rights object for the following segment just prior to and during the transfer of the segment from the source device to the sink device.

FIG. 9 is a diagram illustrating an embodiment of the updated rights object, showing that the usable flag for the segment has been updated to a "false" state to indicate that the source device 102 can no longer use the segment. At this point, the sink device 104 can begin presenting the MPEG data contained in the first segment and at the same time kick off the transfer of the next segment with another HTTP GET request with a content range of 7.5 MB to 15 MB. As before, the source device responds to the request by determining if the rights object permits the media transfer (block 410) of the requested segment and reserving the copy of the media asset segment (block 414). This can be accomplished by appending another element to the copy list of the rights object with a usable copy count of one, and the usable flag set to true. The byte offset and segment size for segment 1 may also be included. FIG. 10 is a diagram illustrating an embodiment of the updated rights object 1000 for the following segment just prior to and during the transfer of the segment from the source device 102 to the sink device 104.

This pattern will continue until all segments are transferred. If a segment fails to transfer, rights object information for the interrupted segment entry is completely removed from the rights object. This permits the sink device 104 to request to retransmit the segment with a different content range than the request that resulted in the interrupted segment. For example, the sink device 104 may request a content range that produces a smaller segment, thus increasing the chance that the transfer succeeds on the next attempt. If a segment is requested that overlaps with segment that has already been transferred (e.g. by error), a new copy of the media asset or media asset segment must be allocated or (if copy counts or policy does not permit this) the request is rejected by the source device.

Hardware Environment

Figure 11:
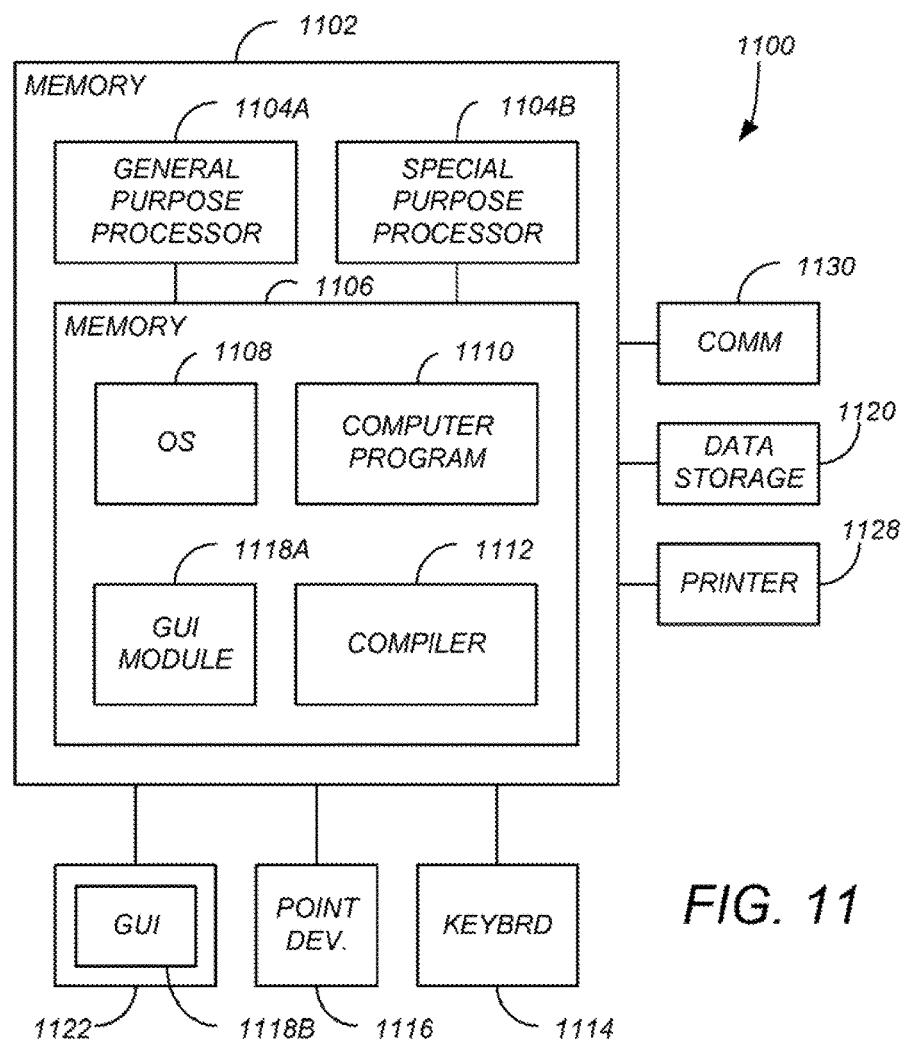
FIG. 11 is a diagram illustrating an exemplary computer system that could be used to implement elements of the present invention.

FIG. 11 is a diagram illustrating an exemplary computer system 1100 that could be used to implement elements of the present invention, including the source device 102 and the sink device 104. The computer 1102 comprises a general purpose hardware processor 1104A and/or a special purpose hardware processor 1104B (hereinafter alternatively collectively referred to as processor 1104) and a memory 1106, such as random access memory (RAM). The computer 1102 may be coupled to other devices, including input/output (I/O) devices such as a keyboard 1114, a mouse device 1116 and a printer 1128.

In one embodiment, the computer 1102 operates by the general purpose processor 1104A performing instructions defined by the computer program 1110 under control of an operating system 1108. The computer program 1110 and/or the operating system 1108 may be stored in the memory 1106 and may interface with the user and/or other devices to accept input and commands and, based on such input and commands and the instructions defined by the computer program 1110 and operating system 1108 to provide output and results.

Output/results may be presented on the display 1122 or provided to another device for presentation or further processing or action. In one embodiment, the display 1122 comprises a liquid crystal display (LCD) having a plurality of separately addressable pixels formed by liquid crystals. Each pixel of the display 1122 changes to an opaque or translucent state to form a part of the image on the display in response to the data or information generated by the processor 1104 from the application of the instructions of the computer program 1110 and/or operating system 1108 to the input and commands. Other display 1122 types also include picture elements that change state in order to create the image presented on the display 1122. The image may be provided through a graphical user interface (GUI) module 1118A. Although the GUI module 1118A is depicted as a separate module, the instructions performing the GUI functions can be resident or distributed in the operating system 1108, the computer program 1110, or implemented with special purpose memory and processors.

Some or all of the operations performed by the computer 1102 according to the computer program 1110 instructions may be implemented in a special purpose processor 1104B. In this embodiment, some or all of the computer program 1110 instructions may be implemented via firmware instructions stored in a read only memory (ROM); a programmable read only memory (PROM) or flash memory within the special purpose processor 1104B or in memory 1106. The special purpose processor 1104B may also be hardwired through circuit design to perform some or all of the operations to implement the present invention. Further, the special purpose processor 1104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 1102 may also implement a compiler 1112 which allows an application program 1110 written in a programming language such as COBOL, C++, FORTRAN, or other language to be translated into processor 1104 readable code. After completion, the application or computer program 1110 accesses and manipulates data accepted from I/O devices and stored in the memory 1106 of the computer 1102 using the relationships and logic that was generated using the compiler 1112.

The computer 1102 also optionally comprises an external communication device such as a modem, satellite link, Ethernet card, or other device for accepting input from and providing output to other computers.

In one embodiment, instructions implementing the operating system 1108, the computer program 1110, and/or the compiler 1112 are tangibly embodied in a computer-readable medium, e.g., data storage device 1120, which could include one or more fixed or removable data storage devices, such as a zip drive, floppy disc drive, hard drive, CD-ROM drive, tape drive, or a flash drive. Further, the operating system 1108 and the computer program 1110 are comprised of computer program instructions which, when accessed, read and executed by the computer 1102, causes the computer 1102 to perform the steps necessary to implement and/or use the present invention or to load the program of instructions into a memory, thus creating a special purpose data structure causing the computer to operate as a specially programmed computer executing the method steps described herein. Computer program 1110 and/or operating instructions may also be tangibly embodied in memory 1106 and/or data communications devices 1130, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 1102.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

The foregoing disclosure described a method of asset transfer called segmented asset transfer which makes possible the implementation of such features as "watch as you transfer" and "offsetted resumption of interrupted transfers". Implementation strategies of these features with support for segmented and contiguous assets were also discussed. The concept of "on-the-fly logical segmentation" with contiguous assets was introduced. "Unique device ID based copy ownership", which will facilitate the source's ability to manage copy counts was introduced. Expanded rights policy capabilities leveraging "Unique device ID based copy ownership" were called out such as the ability for a source device to specify how many copies of an asset a particular sink device would be allowed to transfer.

The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of transferring a media asset segmented into a plurality of media asset segments, from a source device to a sink device, wherein the media asset is associated with a rights object having copy restriction data, the method comprising:
   (a) establishing a move exchange key for the media asset segment;
   (b) receiving a command to transfer a media asset segment from the source device to the sink device;
   (c) determining from the rights object, if the transferring of the media asset segment from the source device to the sink device complies with the copy restriction data for the segment of the media asset;
   (d) if the transferal of the media segment asset from the source device to the sink device complies with the first media asset copy restriction data:
      (d1) updating the copy restriction data of the rights object associated with the media asset segment;
      (d2) encrypting the media asset segment according to the move exchange key;
      (d3) transmitting the encrypted media asset segment to the sink device;
      (d4) updating usability restriction data of the rights object to indicate that the media asset segment is no longer usable by the source;
   (e) repeating (a)-(d) for each of the plurality of media asset segments,
   wherein the method further comprises:
   re-establishing the media transfer key for the interrupted segment of the media asset segments;
   receiving a command to retransfer an interrupted segment of the plurality of media segments after detection of an interruption of the transfer of the interrupted media segment from the source device to the sink device;
   determining from the rights object, if the transferring of the interrupted segment of the media asset segments from the source device to the sink device complies with the copy restriction data for the interrupted segment of the media asset;
   if the transferal of the interrupted media segment asset from the source device to the sink device complies with the interrupted media asset copy restriction data:
      updating the copy restriction data of the rights object associated with the interrupted media asset segment;

encrypting the interrupted media asset segment according to a transfer key;
transmitting the interrupted media asset segment to the sink device; and
updating usability.

2. The method of claim 1, wherein:
updating the copy restriction data of the rights object associated with the media asset segment comprises:
incrementing a usable copy count associated with the media asset segment.

3. The method of claim 1, wherein:
the command to transfer the media asset comprises:
a reference to a temporally first media asset segment of the plurality of media segments; and
a reference to the move exchange key for the media asset segment.

4. The method of claim 3, wherein:
the reference to the temporally first media asset segment comprises a first byte offset; and
the reference to the further media asset segment comprises a second byte offset.

5. The method of claim 1, wherein:
command to transfer the media asset comprises:
a hypertext transfer protocol (HTTP) GET command having a uniform resource identifier (URI) corresponding to the media asset segment and a move exchange key identifier.

6. The method of claim 5, wherein the HTTP GET command further comprises a content range header specifying starting byte offset of the media segment, the starting byte offset of the media segment determined from a current segment start offset variable updated according to a last media asset segment to be transmitted to the sink device.

7. The method of claim 1, wherein:
the copy restriction data includes a maximum copy count of the media asset segment;
determining, from the rights object, if the transferring of the media asset segment from the source device to the sink device complies with the copy restriction data for the media asset comprises:
comparing the current copy count for the media asset segment to a maximum copy count of the media asset segment;
updating the copy restriction data of the rights object associated with the media asset segment comprises incrementing the current copy count associated with the media asset segment.

8. The method of claim 1, further comprising:
indicating that the media asset is transferrable before receiving the command to transfer the media asset segment from the source device to the sink device.

9. The method of claim 8, wherein:
the transferring of the media asset complies with the Digital Transmission Content Protection-Internet Protocol (DTCP-IP); and
the media asset is determined to be movable according to a Digital Living Network Alliance (DLNA) flag parameter.

10. The method of claim 1, wherein:
the copy restriction data comprises:
a maximum copy count of the media asset;
a copy count for each version of the media asset; and
a usable copy count for each segment of each version of the media asset.

11. The method of claim 1, further comprising:
before determining if the transferring of the media asset segment from the source device to the sink device complies with the copy restriction data for the segment of the media asset:
determining a size of the media asset segment; and
generating an updated rights object having copy restriction data for the media asset segment.

12. A method of transferring a media asset segmented into a plurality of media asset segments, from a source device to a sink device, wherein the media asset is associated with a rights object having copy restriction data, the method comprising:
(a) establishing a move exchange key for the media asset segment;
(b) receiving a command to transfer a media asset segment from the source device to the sink device;
(c) determining from the rights object, if the transferring of the media asset segment from the source device to the sink device complies with the copy restriction data for the segment of the media asset;
(d) if the transferal of the media segment asset from the source device to the sink device complies with the first media asset copy restriction data:
(d1) updating the copy restriction data of the rights object associated with the media asset segment;
(d2) encrypting the media asset segment according to the move exchange key;
(d3) transmitting the encrypted media asset segment to the sink device;
(d4) updating usability restriction data of the rights object to indicate that the media asset segment is no longer usable by the source;
(e) repeating (a)-(d) for each of the plurality of media asset segments,
wherein:
the media asset comprises a plurality of versions of the media asset; and the method further comprises:
receiving a command to transfer the media asset segment from the source device to the sink device comprises;
receiving a command to transfer the media asset segment of a version of the media asset from the source device to the sink device;
determining from the rights object, if the transferring of the media asset segment from the source device to the sink device complies with the copy restriction data for the segment of the media asset comprises:
comparing the sum of the copy counts of the plurality of versions of the media asset with the maximum copy count of the media asset;
updating the copy restriction data of the rights object associated with the media access segment comprises:
incrementing the usable copy count of the version of the media asset.

13. An apparatus for transferring a media asset segmented into a plurality of media asset segments, from a source device to a sink device, wherein the media asset is associated with a rights object having copy restriction data, the apparatus comprising:
a processor;
a memory, communicatively coupled to the processor, the memory storing processor instructions, the processor instructions comprising instructions for:
(a) establishing a move exchange key for the media asset segment;
(b) receiving a command to transfer a media asset segment from the source device to the sink device;

(c) determining from the rights object, if the transferring of the media asset segment from the source device to the sink device complies with the copy restriction data for the segment of the media asset;

(d) if the transferal of the media segment asset from the source device to the sink device complies with the first media asset copy restriction data:

(d1) updating the copy restriction data of the rights object associated with the media asset segment;

(d2) encrypting the media asset segment according to the move exchange key;

(d3) transmitting the encrypted media asset segment to the sink device;

(d4) updating usability restriction data of the rights object to indicate that the media asset segment is no longer usable by the source device;

(e) repeating (a)-(d) for each of the plurality of media asset segments, wherein the instructions further comprise instructions for:

re-establishing a the media transfer key for the interrupted segment of the media asset segments;

receiving a command to retransfer an interrupted segment of the plurality of media segments after detection of an interruption of the transfer of the interrupted media segment from the source device to the sink device;

determining from the rights object, if the transferring of the interrupted segment of the media asset segments from the source device to the sink device complies with the copy restriction data for the interrupted segment of the media asset;

if the transferal of the interrupted media segment asset from the source device to the sink device complies with the interrupted media asset copy restriction data:

updating the copy restriction data of the rights object associated with the interrupted media asset segment;

encrypting the interrupted media asset segment according to a transfer key;

transmitting the interrupted media asset segment to the sink device; and updating usability restriction data of the rights object to indicate that the interrupted media asset segment is no longer usable by the source device.

14. The apparatus of claim 13, wherein:

the instructions for updating the copy restriction data of the rights object associated with the media asset segment comprise:

instructions for incrementing a usable copy count associated with the media asset segment.

15. The apparatus of claim 13, wherein:

the command to transfer the media asset comprises:

a reference to a temporally first media asset segment of the plurality of media segments; and a reference to the move exchange key for the media asset segment.

16. The apparatus of claim 15, wherein:

the reference to the temporally first media asset segment comprises a first byte offset; and the reference to the further media asset segment comprises a second byte offset.

17. The apparatus of claim 13, wherein:

the command to transfer the media asset comprises:

a hypertext transfer protocol (HTTP) GET command having a uniform resource identifier (URI) corresponding to the media asset segment and a move exchange key identifier.

18. The apparatus of claim 17, wherein the HTTP GET command further comprises a content range header specifying starting byte offset of the media segment, the starting byte offset of the media segment determined from a current segment start offset variable updated according to a last media asset segment to be transmitted to the sink device.

* * * * *